(12) United States Patent
Moon et al.

(10) Patent No.: US 10,430,671 B2
(45) Date of Patent: Oct. 1, 2019

(54) SYSTEM AND METHOD FOR REMAPPING SURFACE AREAS OF A VEHICLE ENVIRONMENT

(71) Applicant: Honda Motor Co., Ltd., Tokyo (JP)

(72) Inventors: John P. Moon, San Jose, CA (US); Robert Wesley Murrish, Santa Clara, CA (US)

(73) Assignee: Honda Motor Co., Ltd., Tokyo (JP)

( * ) Notice: Subject to any disclaimer, the term of this patent is extended or adjusted under 35 U.S.C. 154(b) by 230 days.

(21) Appl. No.: 15/494,470

(22) Filed: Apr. 22, 2017

(65) Prior Publication Data

US 2018/0307914 A1    Oct. 25, 2018

(51) Int. Cl.
| | |
|---|---|
| H04N 7/18 | (2006.01) |
| H04N 9/47 | (2006.01) |
| G06K 9/00 | (2006.01) |
| G06T 19/00 | (2011.01) |

(52) U.S. Cl.
CPC ..... *G06K 9/00791* (2013.01); *G06K 9/00671* (2013.01); *G06T 19/006* (2013.01)

(58) Field of Classification Search
CPC ............ G06K 9/00671; G06K 9/00791; G06T 19/006
See application file for complete search history.

(56) References Cited

U.S. PATENT DOCUMENTS

| | | | |
|---|---|---|---|
| 6,665,439 B1 | 12/2003 | Takahashi | |
| 8,368,753 B2 | 2/2013 | Zalewski | |
| 8,576,276 B2 | 11/2013 | Bar-Zeev et al. | |
| 8,585,476 B2 | 11/2013 | Mullen | |
| 8,957,915 B1 | 2/2015 | Chalasani et al. | |
| 9,230,501 B1* | 1/2016 | Starner | ............... G09G 5/00 |
| 2008/0112595 A1* | 5/2008 | Loos | ............ G06K 9/00778 |
| | | | 382/107 |
| 2011/0273582 A1* | 11/2011 | Gayko | ................. G06T 5/005 |
| | | | 348/222.1 |
| 2014/0198955 A1* | 7/2014 | Deigmoeller | .......... G06T 7/223 |
| | | | 382/107 |
| 2015/0145887 A1* | 5/2015 | Forutanpour | .......... G06F 3/017 |
| | | | 345/633 |

(Continued)

FOREIGN PATENT DOCUMENTS

WO    2017/000466    1/2017

OTHER PUBLICATIONS

O'Donovan, Peter; "Optical Flow: Techniques and Applications" University of Saskatchewan, Apr. 6, 2005 (Year: 2005).*

*Primary Examiner* — Jessica M Prince
(74) *Attorney, Agent, or Firm* — Rankin, Hill & Clark LLP

(57) ABSTRACT

A system and method for remapping surface areas of vehicle environment that include receiving a plurality of images of the surface areas of the vehicle environment from a computing device. The system and method also include evaluating the plurality of images to determine an optical flow value associated with at least one pixel of at least two images of the plurality of images. The system and method additionally include determining at least one surface area that includes an external environment of the vehicle. The system and method further include remapping the surface areas by filtering the at least one surface area from which the external environment is captured.

20 Claims, 6 Drawing Sheets

(56) References Cited

U.S. PATENT DOCUMENTS

| | | | |
|---|---|---|---|
| 2015/0243046 A1* | 8/2015 | Yoshida | G02F 1/13338 348/148 |
| 2015/0294505 A1* | 10/2015 | Atsmon | G06T 19/006 345/633 |
| 2015/0338204 A1* | 11/2015 | Richert | G06T 7/593 348/135 |
| 2017/0004629 A1 | 1/2017 | Zhao | |
| 2017/0182406 A1* | 6/2017 | Castiglia | G06K 9/00778 |
| 2017/0186176 A1* | 6/2017 | Paluri | G06K 9/6212 |
| 2018/0089838 A1* | 3/2018 | Li | G06T 7/269 |
| 2018/0165926 A1* | 6/2018 | Wu | G08B 6/00 |

* cited by examiner

SYSTEM AND METHOD FOR REMAPPING SURFACE AREAS OF A VEHICLE ENVIRONMENT

BACKGROUND

Augmented reality is being increasingly used in and around vehicles to augment vehicle environments with one or more augmented reality graphical objects. In many cases, augmented reality vehicle environments may be presented to a user wearing a head mounted display system. In particular, passengers seated within a vehicle may wear the head mounted display systems to execute software such as games and graphical applications to view immersive augmented reality environments that are overlaid upon one or more surface areas of the vehicle.

In particular, many head mounted display systems have outward facing cameras that capture the viewpoint of the passengers. Within the vehicle, the outward facing cameras capture the viewpoint that includes a full environment of the vehicle in order to augment the view and provide the augmented reality environments. The full environment may include an interior portion of a cabin of the vehicle and an exterior environment surrounding the vehicle that may be captured through one or more windows of the vehicle. In many cases, the exterior environment of the vehicle includes a dynamic environment that often changes rapidly as the vehicle is being operated and moved. Augmentation of the dynamic exterior environment together with the interior portion of the cabin of the vehicle may result in a distorted viewpoint of the full environment of the vehicle. Consequently, the passengers wearing the head mounted display systems are not provided with an augmented reality environment that provides a clear and immersive experience when executing the games and graphical applications.

BRIEF DESCRIPTION

According to one aspect, a computer-implemented method for remapping surface areas of a vehicle environment that includes receiving a plurality of images of the surface areas of the vehicle environment from a computing device. The surface areas of the vehicle environment includes an internal environment of a vehicle and an external environment surrounding the vehicle. The method also includes evaluating the plurality of images to determine an optical flow value associated with at least one pixel of at least two images of the plurality of images. The method additionally includes determining at least one surface area that includes the external environment of the vehicle. The method further includes remapping the surface areas by filtering the at least one surface area from which the external environment is captured.

According to another aspect, a system for remapping surface areas of a vehicle environment that includes a memory storing instructions when executed by a processor cause the processor to receive a plurality of images of the surface areas of the vehicle environment from a computing device. The surface areas of the vehicle environment includes an internal environment of a vehicle and an external environment surrounding the vehicle. The instructions also cause the processor to evaluate the plurality of images to determine an optical flow value associated with at least one pixel of at least two images of the plurality of images. The instructions additionally cause the processor to determine at least one surface area that includes the external environment of the vehicle. The instructions further cause the processor to remap the surface areas by filtering the at least one surface area from which the external environment is captured.

According to still another aspect, a non-transitory computer readable storage medium stores instructions that, when executed by a computer, which includes at least a processor, causes the computer to perform a method that includes receiving a plurality of images of surface areas of a vehicle environment from a computing device. The surface areas of the vehicle environment includes an internal environment of a vehicle and an external environment surrounding the vehicle. The instructions also include evaluating the plurality of images to determine an optical flow value associated with at least one pixel of at least two images of the plurality of images. The instructions additionally include determining at least one surface area that includes the external environment of the vehicle. The instructions further include remapping the surface areas by filtering the at least one surface area from which the external environment is captured.

DETAILED DESCRIPTION

Figure 1:
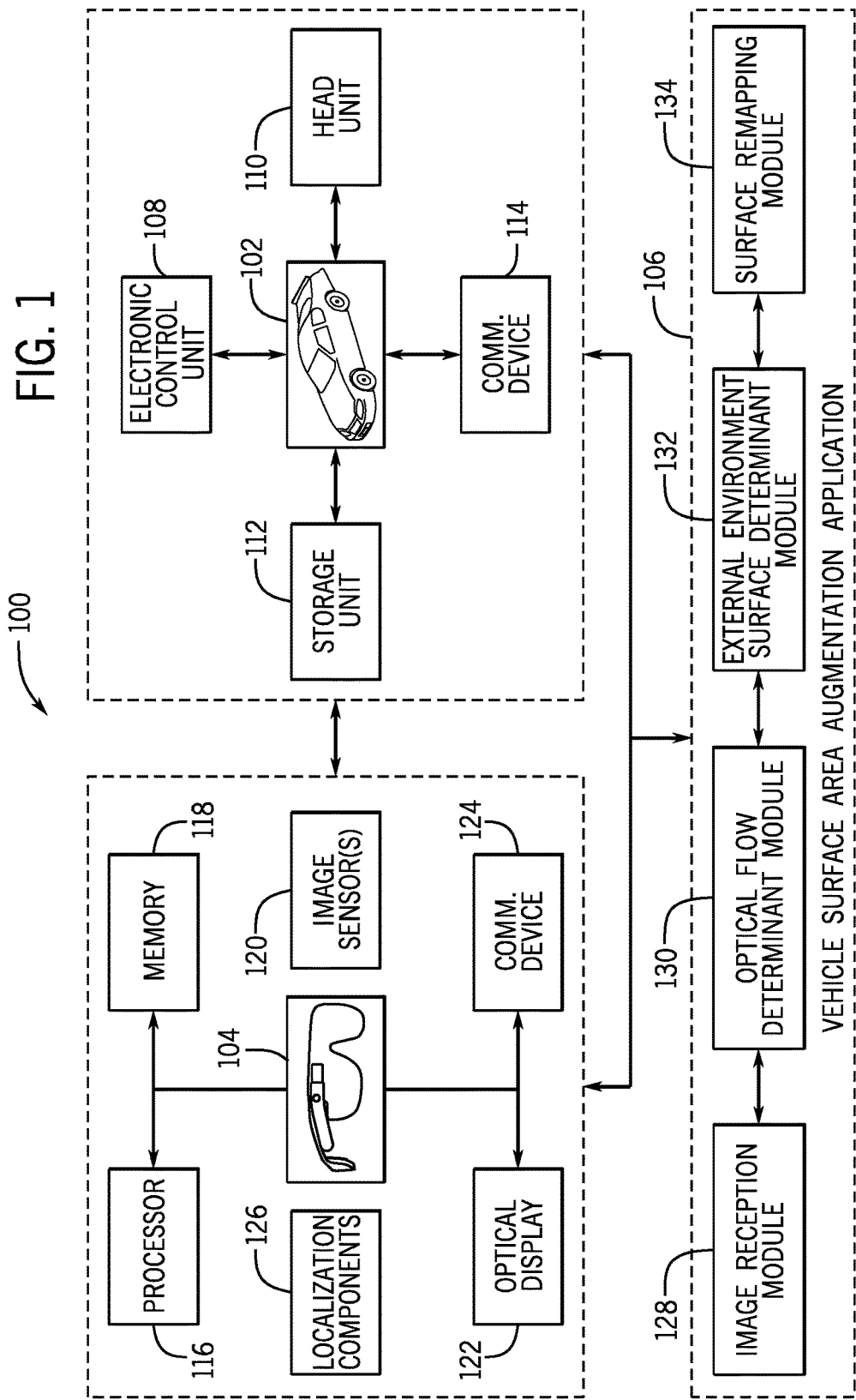
FIG. 1 is a schematic view of a system for remapping surface areas of a vehicle environment according to an exemplary embodiment.

The following includes definitions of selected terms employed herein. The definitions include various examples and/or forms of components that fall within the scope of a term and that may be used for implementation. The examples are not intended to be limiting.

A "bus", as used herein, refers to an interconnected architecture that is operably connected to other computer components inside a computer or between computers. The bus may transfer data between the computer components. The bus may be a memory bus, a memory controller, a peripheral bus, an external bus, a crossbar switch, and/or a local bus, among others. The bus may also be a vehicle bus that interconnects components inside a vehicle using protocols such as Media Oriented Systems Transport (MOST), Controller Area network (CAN), Local Interconnect Network (LIN), among others.

"Computer communication", as used herein, refers to a communication between two or more computing devices (e.g., computer, personal digital assistant, cellular telephone, network device) and may be, for example, a network transfer, a file transfer, an applet transfer, an email, a hypertext transfer protocol (HTTP) transfer, and so on. A computer communication may occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "disk", as used herein may be, for example, a magnetic disk drive, a solid state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD ROM). The disk may store an operating system that controls or allocates resources of a computing device.

A "database", as used herein may refer to table, a set of tables, a set of data stores and/or methods for accessing and/or manipulating those data stores. Some databases may be incorporated with a disk as defined above.

A "memory", as used herein may include volatile memory and/or non-volatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM). The memory may store an operating system that controls or allocates resources of a computing device.

A "module", as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

An "operable connection", or a connection by which entities are "operably connected", is one in which signals, physical communications, and/or logical communications may be sent and/or received. An operable connection may include a wireless interface, a physical interface, a data interface and/or an electrical interface.

A "processor", as used herein, processes signals and performs general computing and arithmetic functions. Signals processed by the processor may include digital signals, data signals, computer instructions, processor instructions, messages, a bit, a bit stream, or other means that may be received, transmitted and/or detected. Generally, the processor may be a variety of various processors including multiple single and multicore processors and co-processors and other multiple single and multicore processor and co-processor architectures. The processor may include various modules to execute various functions.

A "portable device", as used herein, is a computing device typically having a display screen with user input (e.g., touch, keyboard) and a processor for computing. Portable devices include, but are not limited to, handheld devices, mobile devices, smart phones, laptops, tablets and e-readers. In some embodiments, a "portable device" could refer to a remote device that includes a processor for computing and/or a communication interface for receiving and transmitting data remotely.

A "vehicle", as used herein, refers to any moving vehicle that is capable of carrying one or more human occupants and is powered by any form of energy. The term "vehicle" includes, but is not limited to: cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" may refer to an electric vehicle (EV) that is capable of carrying one or more human occupants and is powered entirely or partially by one or more electric motors powered by an electric battery. The EV may include battery electric vehicles (BEV) and plug-in hybrid electric vehicles (PHEV). The term "vehicle" may also refer to an autonomous vehicle and/or self-driving vehicle powered by any form of energy. The autonomous vehicle may or may not carry one or more human occupants. Further, the term "vehicle" may include vehicles that are automated or non-automated with pre-determined paths or free-moving vehicles.

A "vehicle system", as used herein may include, but is not limited to, any automatic or manual systems that may be used to enhance the vehicle, driving and/or safety. Exemplary vehicle systems include, but are not limited to: an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, an electronic pretensioning system, among others.

A "wearable computing device", as used herein may include, but is not limited to, a computing device component (e.g., a processor) with circuitry that may be worn by and/or in possession of a user. In other words, a wearable computing device is a computer that is subsumed into the personal space of a user. Wearable computing devices may include a display and may include various sensors for sensing and determining various parameters associated with a user. For example, location, motion, and biosignal (physiological) parameters, among others. Some wearable computing devices have user input and output functionality. Exemplary wearable computing devices may include, but are not limited to, watches, glasses, clothing, gloves, hats, shirts, jewelry, rings, earrings necklaces, armbands, shoes, earbuds, headphones and personal wellness devices.

A "value" and "level", as used herein may include, but is not limited to, a numerical or other kind of value or level such as a percentage, a non-numerical value, a discrete state, a discrete value, a continuous value, among others. The term "value of X" or "level of X" as used throughout this detailed description and in the claims refers to any numerical or other kind of value for distinguishing between two or more states of X. For example, in some cases, the value or level of X may be given as a percentage between 0% and 100%. In other cases, the value or level of X could be a value in the range between 1 and 10. In still other cases, the value or level of X may not be a numerical value, but could be associated with a given discrete state, such as "not X", "slightly x", "x", "very x" and "extremely x".

I. System Overview

Referring now to the drawings, wherein the showings are for purposes of illustrating one or more exemplary embodiments and not for purposes of limiting same, FIG. 1 is a schematic view of a system 100 for remapping surface areas of a vehicle environment according to an exemplary embodiment. The components of the system 100, as well as the components of other systems, hardware architectures and software architectures discussed herein, may be combined, omitted or organized into different architecture for various embodiments. However, the exemplary embodiments discussed herein focus on the environment as illustrated in FIG. 1, with corresponding system components, and related methods.

As discussed in more detail below, the system 100 may be implemented to provide a passenger (not shown) of a vehicle 102 with an augmented reality vehicle environment (not shown in FIG. 1) that may be presented to the passenger through a wearable device 104 being worn by the passenger. In particular, the system 100 may include a vehicle surface area augmentation application 106 (hereinafter simply referred to as a vehicle augmentation application) that may be executed to present the augmented vehicle environment to the passenger of the vehicle 102.

In one embodiment, the augmented vehicle environment may include surface area graphical augmentations. The surface area graphical augmentations may include, but are not limited to one or more graphical user interfaces, one or more graphical objects, one or more graphical icons, and the like that may be presented to the passenger in various formats (e.g., two-dimensional, three-dimensional, holographic) through the wearable device 104. In particular, the surface area graphical augmentations may be presented to the passenger to appear over or as part of one or more surface areas of an interior cabin (not shown in FIG. 1) of the vehicle 102. For example, the surface area graphical augmentations may be presented as part of the augmented vehicle environment that may be overlaid atop of vehicle components and features located at the one or more surface areas of the interior cabin of the vehicle 102.

As discussed below, components of the wearable device 104 may capture a plurality of images as the passenger is wearing the wearable device 104 within the vehicle 102. The plurality of images may be captured of surface areas of the vehicle environment that may include the interior cabin and an exterior environment surrounding the vehicle 102 captured by the wearable device 104 as the passenger faces one or more areas of the vehicle 102. The surface areas of the vehicle environment that include interior cabin may include a static environment. In other words, the one or more surface areas of the interior cabin of the vehicle 102 may not be associated with rapid movement since the surface areas mainly include static objects such as the vehicle components and features.

Alternatively, the surface areas of the vehicle environment that include the exterior environment surrounding the vehicle 102 may include a dynamic environment that may rapidly change as the vehicle 102 is being operated and moved. In particular, the one or more surface areas of the exterior environment of the vehicle 102 that are captured by the wearable device 104 (e.g., through windows of the vehicle 102) may include dynamic objects (not shown) such as other vehicles, buildings, pedestrians, and the like that may move rapidly or appear to move rapidly as they are being captured. Therefore, content associated with the external environment surrounding the vehicle 102 may change rapidly as numerous images of the external environment are captured by the wearable device 104.

As discussed below, the vehicle augmentation application 106 may be implemented to evaluate the plurality of images captured of the surface areas of the vehicle environment and determine an optical flow value associated with each pixel of a determined subset of the plurality of images. Based on the evaluation and tracking of the optical flow value, the vehicle augmentation application 106 may present the augmented vehicle environment in a format that remaps the surface areas of the vehicle environment to filter the dynamic exterior environment surrounding the vehicle 102 as captured by the wearable device 104. Consequently, upon remapping the surface areas of the vehicle environment, the application 106 may render the surface area graphical augmentations at one or more remaining surface areas of the vehicle environment that may include the static interior cabin to present the augmented vehicle environment in an immersive and clear manner without any distortion caused by the dynamic exterior environment surrounding the vehicle 102.

As shown in FIG. 1, the vehicle 102 may include an electronic control unit (ECU) 108 that may operably control one or more components of the vehicle 102. Generally, the ECU 108 may provide processing, communication and control of the component(s) and may include a processor, memory, an interface circuit, and bus lines for transferring data, however, for simplicity, these components are not shown. The electronic control unit 108 may consist of various modules (not shown) to control various vehicle systems and vehicle components of the vehicle 102. The electronic control unit 108 may be connected to input sensors (not shown) that provide the electronic control unit 108 with data related to the component(s).

The vehicle 102 may additionally include a head unit 110 that may communicate with the components of the vehicle 102 and the wearable device 104. The head unit 110 may include internal processing memory, an interface circuit, and bus lines for transferring data, sending commands, and communicating with the vehicle systems, however, for simplicity, these components are not shown. In one embodiment, the internal processing memory of the head unit 110 may store data that is utilized by one or more operating systems and/or applications executed by the head unit 110. In particular, the head unit 110 may store and execute data associated with the vehicle augmentation application 106 and may communicate application specific data to the wearable device 104 during the execution of the application 106.

In one embodiment, the ECU 108 and/or the head unit 110 may store and/or retrieve data from a storage unit 112 of the vehicle 102. The storage unit 112 may store one or more operating systems, applications, associated operating system data, application data, vehicle system and subsystem user interface data, and the like that are executed by the ECU 108 and/or the head unit 110. In particular, the ECU 108 and/or the head unit 110 may execute the vehicle augmentation application 106 by executing associated executable application files (not shown) stored on storage unit 112 of the vehicle 102. As discussed below, the storage unit 112 may additionally store image data pertaining to a plurality of images (e.g., image frames from video) that are captured by the wearable device 104 to be evaluated by the vehicle augmentation application 106. In one embodiment, the storage unit 112 may be accessed by one or more components of the vehicle augmentation application 106 to retrieve the image data to be further evaluated by the application 106.

The vehicle 102 may additionally include a communication device 114 that may communicate with external components of the system 100 including the wearable device 104 and/or internal components of the vehicle 102 including the ECU 108 and the head unit 110. More specifically, the communication device 114 may include one or more transceivers that are capable of providing wireless computer communications utilizing various protocols to be utilized to send/receive electronic signals internally to components and systems within the vehicle 102 and to external devices including the wearable device 104. In some embodiments, the communication device 114 may receive one or more data signals from the wearable device 104 and may provide the data to the head unit 110 to be evaluated by the vehicle augmentation application 106.

With specific reference to the wearable device 104, generally, the wearable device 104 of the system 100 may include a head mounted computing display device that may be worn by the passenger of the vehicle 102. In alternate embodiments, the wearable device 104 may include a virtual headset, a watch, a bracelet, a piece of headwear, among others, each of which may typically include or are connected to a display (alternative devices and associated displays not shown). The wearable device 104 may be controlled by a processor 116 that provides processing and executes computing functions as required by an operating system and/or applications installed onto a memory 118. In particular, the processor 116 may execute the vehicle augmentation application 106 by executing associated executable application files (not shown) stored on the memory 118 of the wearable device 104.

In one embodiment, the memory 118 may store image data pertaining to the plurality of images (e.g., image frames from video) that may be communicated to the components of the vehicle augmentation application 106 to be evaluated by the vehicle augmentation application 106. The memory 118 may be accessed by one or more components of the vehicle augmentation application 106 to retrieve the image data to be further evaluated by the application 106.

In an exemplary embodiment, the wearable device 104 may include one or more image sensors 120. The image sensor(s) 120 may include one or more cameras (not shown) that may include, but may not be limited to, an infrared camera, a digital camera, a video camera (camera types not individually shown), and the like that may be mounted/disposed at one or more areas of the wearable device 104. For example, a first camera may be disposed at a right front portion (not shown) and a second camera may be disposed at a left front portion (not shown) of the wearable device 104 to capture the plurality of images of the surface areas of the vehicle environment based on a viewpoint of the passenger (e.g., the direction that the passenger is facing within the cabin of the vehicle 102).

In one or more embodiments, the image sensor(s) 120 may provide a sequence of images/video that may pertain to the surface areas of the vehicle environment included within a surrounding environment of the wearable device 104. Therefore, when the passenger is seated within the vehicle 102, the sequence of images/video captured by the image sensor(s) 120 may include the interior cabin of the vehicle 102 and the external environment surrounding the vehicle 102 that may be captured through one or more of the windows of the vehicle 102.

In one or more embodiments, the image sensor(s) 120 may execute an image logic that may be utilized to evaluate one or more portions (e.g., pixels) of the image(s) captured by the image sensor(s) 120. Additionally, the image logic may also be evaluated to aggregate a plurality of images captured by two or more image sensors 120. The aggregation of the plurality of images may be completed based on communication of numerous image sensor(s) 120 to provide image data (e.g., a single data packet) that pertains to the plurality of images captured during a predetermined period of time by the image sensor(s) 120.

As discussed below, the image data provided by the image sensor(s) 120 of the plurality of images captured during the predetermined period of time may be evaluated by the vehicle augmentation application 106 to identify at least one surface area of the vehicle 102 (e.g., a window) from which the dynamic exterior environment surrounding the vehicle 102 is captured. Furthermore, the vehicle augmentation application 106 may remap the surface areas of the vehicle environment based on a determination of fixed lines within the interior vehicle cabin that include a boundary between the at least one surface area of the vehicle 102, from which the dynamic exterior environment surrounding the vehicle 102 is captured, and at least one remaining surface area from which the static interior environment of the vehicle 102 is captured.

In an exemplary embodiment, the wearable device 104 may additionally include an optical display 122. The optical display 122 may include one or more transparent and/or translucent display screens (not shown) that may be used by the processor 116 to present human machine interfaces associated with one or more applications executed and/or accessed by the wearable device 104. In some embodiments, the optical display 122 may include one or more capacitive sensors (not shown) that may enable the optical display 122 to receive touch inputs that may be provided on the human machine interfaces. As discussed below, the vehicle augmentation application 106 may present the augmented vehicle environment to the passenger through the optical display 122 in a manner that augments the surface area graphical augmentations with the remapped surface areas of the vehicle environment.

In one embodiment, the wearable device 104 may include a communication device 124. The communication device 124 may be utilized to provide the one or more applications (e.g., including external applications not stored on the memory 118) and internet resources to the passenger. In addition, the communication device 124 may provide peer-to-peer (P2P) connections to send/receive non-transitory signals with the communication device 114 of the vehicle 102 to be utilized by software applications including the vehicle augmentation application 106.

In some embodiments, the communication device 124 of the wearable device 104 may also provide P2P communications to send and receive data directly with the ECU 108. For example, the ECU 108 may provide data pertaining to the vehicle 102 including but not limited to vehicle dynamics data, vehicle system data, vehicle warning data, and the like that may be provided to the vehicle augmentation application 106 to provide associated formats of the surface area graphical augmentations to the passenger of the vehicle 102 via the wearable device 104.

In an exemplary embodiment, the wearable device 104 may connect to the communication device 114 of the vehicle 102 via a Bluetooth™ connection that may provide data connections to support communication of application data, and/or utilize applications residing within the memory 118 of the wearable device 104. Additionally, the Bluetooth™ connection may be used by the communication device 124 of the wearable device 104 to communicate and/or access data from the ECU 108, the head unit 110, and/or the storage unit 112. For example, a Wi-Fi connection may be established between the communication device 114 and the communication device 124 to communicate data associated with the vehicle augmentation application 106 between the vehicle 102 and the wearable device 104. In some embodiments, alternate type of wireless (e.g., Wi-Fi) connection or a wired (e.g., USB) connection may be utilized to connect the wearable device 104 to the communication device 114 to communicate data from the memory 118 and/or access data from the ECU 108, the head unit 110, and/or the storage unit 112.

In an exemplary embodiment, the wearable device 104 may further include localization components 126 that may be used to determine the position of the wearable device 104 within a vehicle frame and a world frame. In one embodiment, the localization components 126 may include, but may not be limited to, a global positioning system (GPS), an accelerometer, a magnetometer, a gyroscope, and the like (individual components not shown). The localization components 126 may determine the position of the wearable device 104 within the interior cabin of the vehicle 102 as well as a global position of the wearable device 104 that pertains to the external surrounding environment of the vehicle 102.

In one embodiment, the localization components 126 may determine the global position of the wearable device 104 based on locational coordinates (e.g., GPS coordinates). In particular, the localization components 126 may determine the position of the wearable device 104 within the world frame and may provide the position to one or more components of the vehicle augmentation application 106. Upon determining the position of the wearable device 104 within the world frame, the localization components 126 may determine a specific orientation of the wearable device 104 within the interior cabin of the vehicle 102 to determine the position of the wearable device 104 within the vehicle frame. More specifically, upon determining the connection to the vehicle 102 via the communication device 124, the localization components 126 (e.g., gyroscope and accelerometer) may be used to provide the specific orientation of the wearable device 104 as the passenger is moving his or her head and the image sensor(s) 120 are capturing images of the surface areas of the vehicle environment.

In one or more embodiments, the localization components 126 may communicate with a navigation system (not shown) of the vehicle 102 via the communication device 124 to obtain locational coordinates (e.g., GPS/DGPS coordinates) of the vehicle 102. Upon obtaining the locational coordinates, the localization components 126 may communicate the locational coordinates to the vehicle augmentation application 106 which may determine if the wearable device 104 is positioned within the vehicle 102 based on a match (e.g., match within a predetermined distance threshold) between the locational coordinates of the vehicle 102 and the locational coordinates of the wearable device 104 worn by the passenger.

In an exemplary embodiment, upon determining a match between the locational coordinates of the vehicle 102 and the wearable device 104, the localization components 126 may select a specific portion of the vehicle 102 and may assign a guidance point as a point of reference within the interior cabin of the vehicle 102 that may be associated with predetermined locational coordinates. For example, the localization components 126 may select a center of a dashboard (not shown) of the vehicle 102 as the guidance point to be evaluated to determine the position of the wearable device 104 within the vehicle frame. In one embodiment, upon determining that the wearable device 104 is positioned within the vehicle 102, the localization components 126 may communicate with the image sensor(s) 120 to obtain image data associated with the plurality of images captured by the image sensor(s) 120 for a predetermined period of time (e.g., a short period of time when the passenger may be looking towards one or more particular surface areas of the vehicle environment). Upon obtaining the image data associated with the plurality of images, the localization components 126 may evaluate the image data to determine a relative location of the guidance point within the plurality of images to further determine the position of the wearable device 104 within the vehicle frame.

More particularly, the position of the wearable device 104 within the vehicle frame may pertain to the position of the passenger within the interior cabin of the vehicle 102 and may be used to determine if the passenger if located within a specific passenger seat (not shown) of the vehicle 102 as he or she is wearing the wearable device 104. The position of the wearable device 104 within the vehicle frame may be determined as locational coordinate values that may be assigned to each image of the plurality of images. As discussed below, the locational coordinate values may be interpreted by the vehicle augmentation application 106 to determine at least two images of the plurality of images that are captured during the predetermined period of time that are assigned locational coordinates that are matched within a predetermined distance threshold.

In one or more embodiments, the vehicle augmentation application 106 may utilize the locational coordinates assigned to one or more respective images to determine image coordinates that are associated to each of the pixels of the respective image(s) of the plurality of images captured by the wearable device 104. The image coordinates associated to each of the pixels of the respective image(s) may pertain to the portion of the surface areas of the vehicle captured within each pixel of during the predetermined period of time. As described below, the image coordinates associated with each of the pixels may be used to determine fixed lines that are used to render the surface area graphical augmentations on the one or more surface areas of the vehicle environment associated with the internal environment of the vehicle 102.

II. The Vehicle Surface Area Augmentation Application and Related Methods

The components of the vehicle augmentation application 106 will now be described according to an exemplary embodiment and with reference to FIG. 1. In one embodiment, the vehicle augmentation application 106 may be stored on the memory 118 of the wearable device 104 to be executed by the processor 116. In an additional embodiment, the application 106 may be stored on the storage unit 112 of the vehicle 102 and may be accessed by the wearable device 104 and executed by the processor 116 based on a communication link between the communication devices 114, 124. In some embodiments, the vehicle augmentation application 106 may be stored on an externally hosted computing infrastructure (not shown) and may be accessed by the communication device 124 to be executed by the processor 116.

In one embodiment, the vehicle augmentation application 106 may send and receive data from the head unit 110, the storage unit 112, and/or the memory 118 to present one or more types of the surface area graphical augmentations as part of the augmented vehicle environment. In particular, one or more additional applications that are executed by the head unit 110 and stored on the storage unit 112 may provide application data to the vehicle augmentation application 106 to provide the surface area graphical augmentations as part of the augmented vehicle environment. Similarly, one or more additional applications that are executed by the processor 116 and stored on the memory 118 and/or storage unit 112 may provide application data to the vehicle augmentation application 106.

The one or more additional applications may include, but are not limited to, vehicle system applications, gaming applications, navigation applications, vehicle dynamics data applications, three dimensional augmented reality applications, and the like. The one or more additional applications may provide data to the vehicle augmentation application 106 to provide specific types of the surface area graphical augmentations that pertain to the respective application. For example, a gaming application may send gaming data that pertains to a gaming experience to the vehicle augmentation application 106 for the application to provide gaming graphics as the surface area graphical augmentations. The vehicle augmentation application 106 may remap the surface areas of the vehicle environment to render the gaming graphics at one or more surfaces areas from which the internal environment of the vehicle 102 is captured by the image sensor(s) 120. Based on the remapping of the surface areas, the gaming graphics will not be rendered at surface areas of the vehicle environment from which the external environment of the vehicle 102 is captured by the image sensor(s) 120 through the windows of the vehicle 102 that are transparent to the dynamic exterior environment of the vehicle 102.

In one embodiment, the vehicle augmentation application 106 may be enabled based on the enablement of one or more associated applications. In an additional embodiment, the application 106 may be enabled based on activation of the application 106 by the passenger of the vehicle 102 based on a user interface input button that may be provided to the passenger through the wearable device 104. In an exemplary embodiment, upon enablement, a plurality of modules 128-134 of the application 106 may be utilized to remap the surface areas of the vehicle environment and render the surface area graphical augmentations of the augmented vehicle environment to be presented via the optical display 122 to the passenger.

In an exemplary embodiment, the plurality of modules 128-134 may include an image reception module 128, an optical flow determinant module 130 (hereinafter referred to as an optical flow module), an external environment surface determinant module 132 (hereinafter referred to as an external surface module), and a surface remapping module 134. Methods related to one or more processes that are executed by the plurality of modules 128-134 of the vehicle augmentation application 106 will now be described below.

Figure 2:
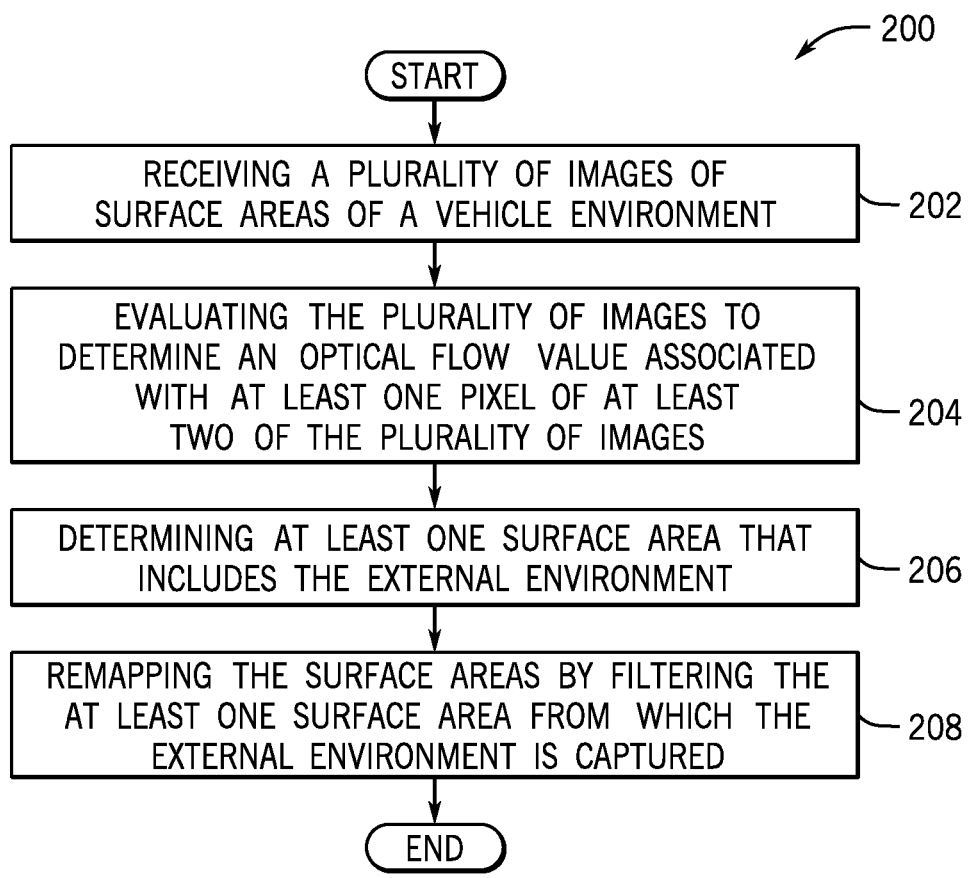
FIG. 2 is a process flow diagram of an illustrative method for remapping the surface areas of the vehicle environment according to an exemplary embodiment.

FIG. 2 is a process flow diagram of an illustrative method 200 for remapping surface areas of a vehicle environment according to an exemplary embodiment. FIG. 2 will be described with reference to the components of FIG. 1, though it is to be appreciated that the method of FIG. 2 may be used with other systems/components. The method 200 may begin at block 202, wherein the method 200 may include receiving a plurality of images of surfaces areas of a vehicle environment.

Figure 3:
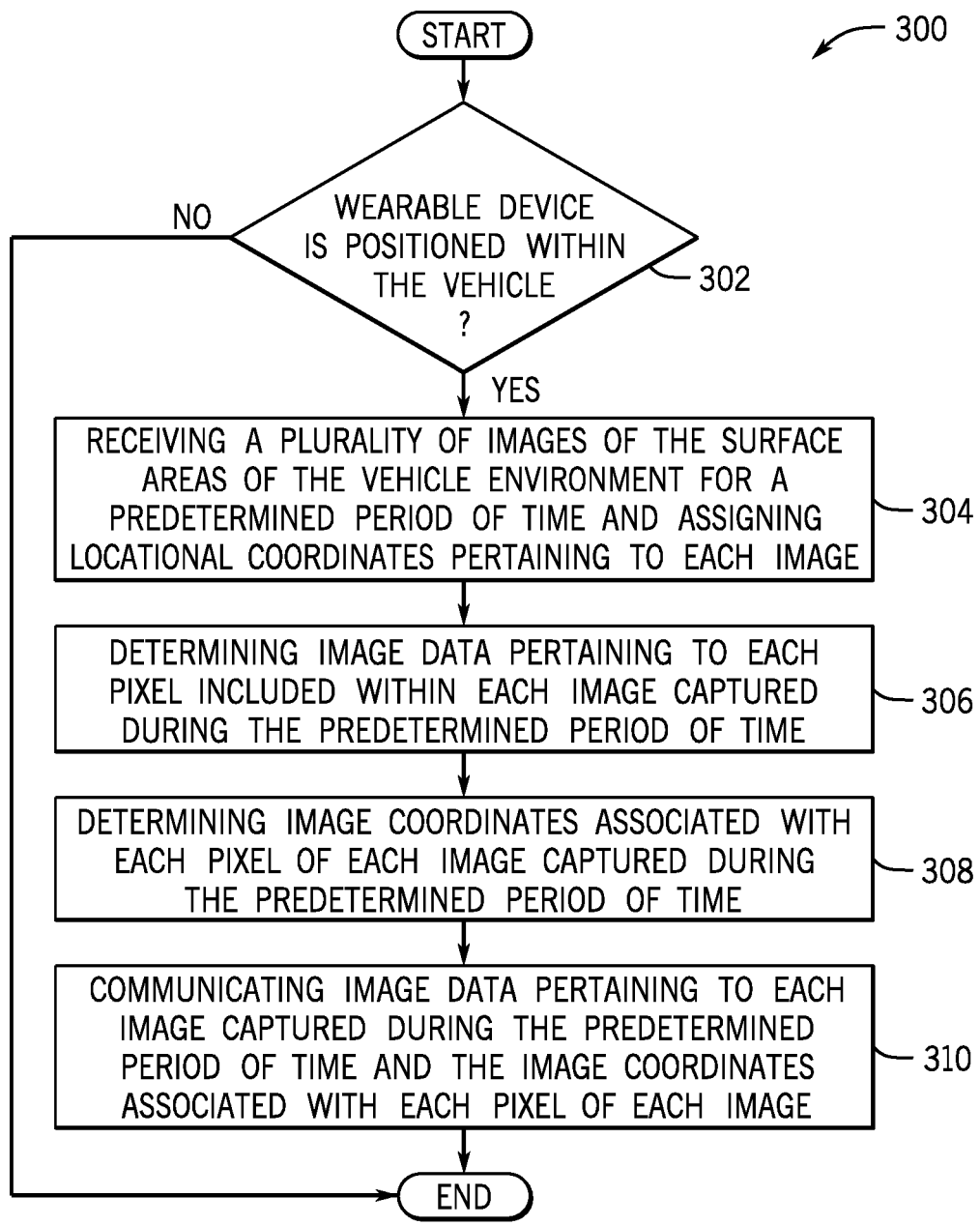
FIG. 3 is a process flow diagram of an illustrative method for receiving a plurality of images of surface areas of the vehicle environment according to an exemplary embodiment.

FIG. 3 is a process flow diagram of an illustrative method 300 for receiving the plurality of images of surface areas of a vehicle environment according to an exemplary embodiment. FIG. 3 will be described with reference to the components of FIG. 1, though it is to be appreciated that the method of FIG. 3 may be used with other systems/components. In an exemplary embodiment, the method 300 may begin at block 302, wherein the method 300 may include determining if the wearable device 104 is positioned within the vehicle 102. In one embodiment, the image reception module 128 of the vehicle augmentation application 106 may send a command signal(s) to the ECU 108 of the vehicle 102 to obtain locational coordinates of the vehicle 102 from the vehicle navigation system or similar component of the vehicle 102. The image reception module 128 may additionally send a command signal(s) to the processor 116 of the wearable device 104 to enable the localization components 126 to determine and communicate the locational coordinates of the wearable device 104 to the image reception module 128.

Upon receipt of the location coordinates of the vehicle 102 and the locational coordinates of the wearable device 104 worn by the passenger, the image reception module 128 may determine if the wearable device 104 is positioned within the vehicle 102 based on a match within a predetermined distance threshold between the locational coordinates of the vehicle 102 and the locational coordinates of the wearable device 104 worn by the passenger. If the image reception module 128 determines that the locational coordinates of the wearable device 104 match with the locational coordinates of the vehicle 102 within the predetermined distance threshold, the image reception module 128 may determine that the wearable device 104 is positioned within the vehicle 102.

If it is determined that the wearable device 104 is positioned within the vehicle 102 (at block 302), the method 300 may proceed to block 304, wherein the method 300 may include receiving a plurality of images of the surface areas of the vehicle environment for a predetermined period of time and assigning locational coordinates pertaining to each image. In an exemplary embodiment, the predetermined period of time may include a period of time that is sufficient for the vehicle augmentation application 106 to evaluate the pixels of each of the plurality of images captured by image sensor(s) 120 to determine the optical flow value associated with each of the pixels of at least two images of the plurality of images.

In an exemplary embodiment, the image sensor(s) 120 may provide image data that pertains to each of the plurality of images that are captured by the image sensor(s) 120 to the image reception module 128. The image data may be provided in one or more data packets to the image reception module 128. Upon receipt of the image data, the image reception module 128 may evaluate the image data associated with each of the plurality of images captured during the predetermined period of time to determine a relative location of the guidance point (discussed above) within the plurality of images to further determine the position of the wearable device 104 within the vehicle frame. Based on the position of the wearable device 104 within the vehicle frame, the image reception module 128 may determine locational coordinates that may be associated with each of the plurality of images and may pertain to a specific point of view of the passenger as the image is captured.

With continued reference to the method 300 of FIG. 3, the method 300 may proceed to block 306, wherein the method 300 may include determining image data pertaining to each pixel included within each image captured during the predetermined period of time. Upon receiving the plurality of images and assigning locational coordinates pertaining to each image, the image reception module 128 may further determine image data pertaining to each pixel included within each specific image. In particular, the image reception module 128 may evaluate the image data associated with each image to determine sub-data that pertains to each pixel of each image. The sub-data may contain data pertaining to one or more portions of the surface areas of the vehicle environment captured by the image sensor(s) 120 within each particular pixel.

In an exemplary embodiment, the image reception module 128 may receive the image data that pertains to each of the plurality of images for the predetermined period of time. Upon determining image data pertaining to each pixel of each of the images of the plurality of images captured during the predetermined period of time, the image reception module 128 may store the image data pertaining to each pixel onto the memory 118 and/or the storage unit 112 to be further evaluated.

The method 300 may proceed to block 308, wherein the method 300 may include determining image coordinates associated with each pixel of each image captured during the predetermined period of time. In an exemplary embodiment, the image reception module 128 may evaluate locational coordinates pertaining to each image (as determined at block 304) and the image data pertaining to each pixel (as determined at block 306) to determine image coordinates associated with each pixel of each of the plurality of images.

In one embodiment, the image reception module 128 may evaluate the locational coordinates pertaining to each image in addition to the image data pertaining to the pixels of each of the plurality of images captured by the wearable device 104 to determine image coordinates that are associated with each of the pixels of each of the plurality of images. The image coordinates may include two dimensional (x,y) coordinates that correspond to the location of one or more objects (e.g., vehicle features, windows, etc.) included and captured of the surface areas of the vehicle environment.

For example, the image coordinates may pertain to the pixels of an image that may include one or more objects of the exterior environment surrounding the vehicle 102 such as buildings and other vehicles seen through a window as captured by the image sensor(s) 120. Similarly, the image coordinates may pertain to pixels of an image that may include one or more objects such as a display screen (not shown) and a dashboard (not shown) found within the interior environment of the vehicle 102 as captured by the image sensor(s) 120. In one or more embodiments, images captured of the same objects within the environment and that are taken from a corresponding frame of reference of the passenger wearing the wearable device 104 may have matching image coordinates that may further evaluated against one another to determine an optical flow value associated with each pixel of each of the plurality of images, as discussed below.

With continued reference to the method 300 of FIG. 3, the method 300 may proceed to block 310, wherein the method 300 may include communicating image data pertaining to each image captured during the predetermined period of time and the image coordinates associated with each pixel of each image. In one embodiment, the image reception module 128 may communicate the image data associated with each image of the plurality of images and the image coordinates associated with each pixel of each image to the optical flow determinant module 130 of the vehicle augmentation application 106 to be evaluated, as discussed in more detail below.

Figure 4:
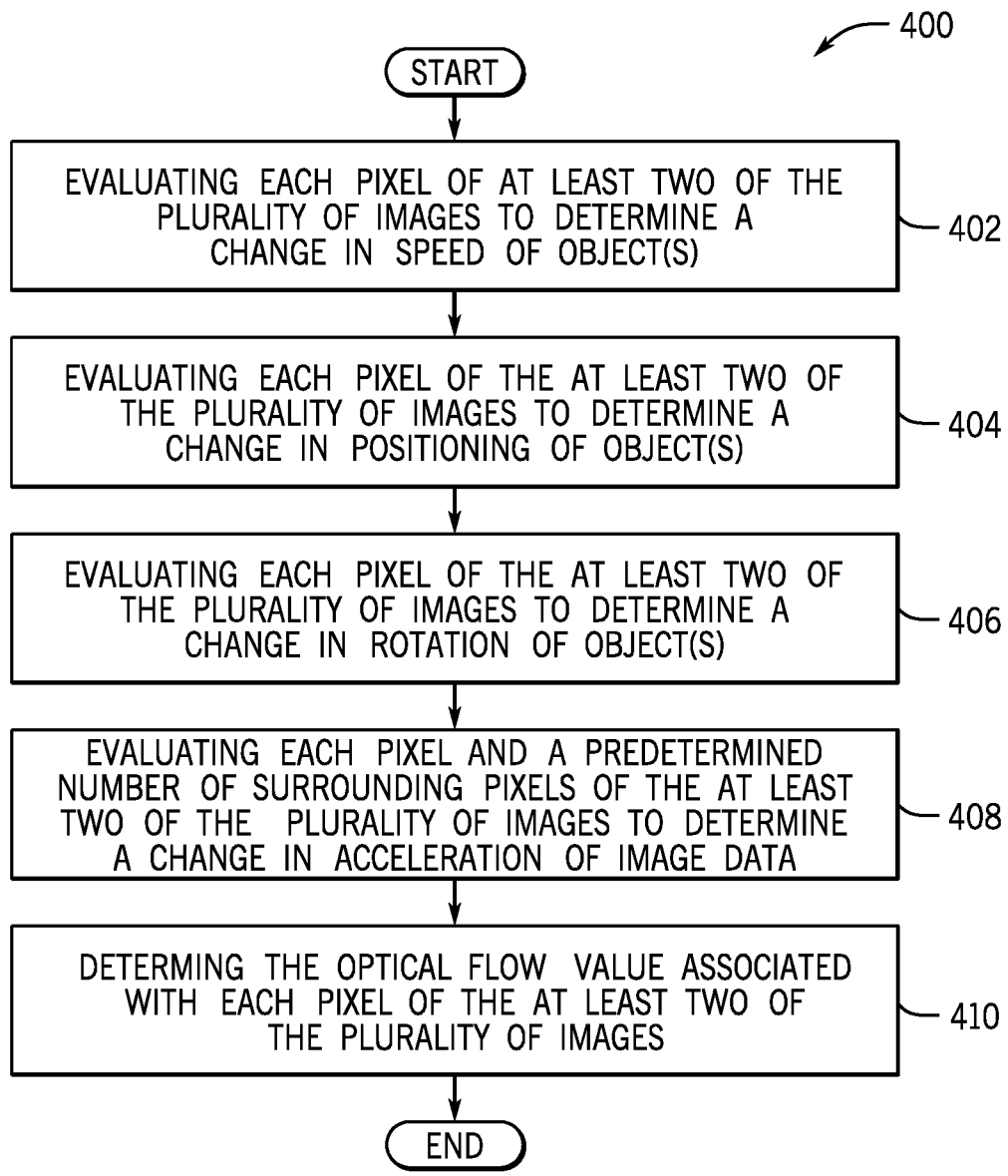
FIG. 4 is a process flow diagram of an illustrative method for determining an optical flow value associated with at least one pixel of at least two images of a plurality of images of the surface areas of the vehicle environment according to an exemplary embodiment.

Referring again to the method 200 of FIG. 2, upon receiving the plurality of images of surface areas of the vehicle environment (at block 202), the method 200 may proceed to block 204, wherein the method 200 may include evaluating the plurality of images to determine an optical flow value associated with at least one pixel of at least two of the plurality of images. FIG. 4 is a process flow diagram of an illustrative method 400 for determining the optical flow value associated with the at least one pixel of the at least two images of the plurality of images of the surface areas of the vehicle environment according to an exemplary embodiment. FIG. 4 will be described with reference to the components of FIG. 1, though it is to be appreciated that the method of FIG. 4 may be used with other systems/components. In an exemplary embodiment, the method 400 applies to the plurality of images captured by the image sensor(s) 120 during the predetermined period of time and received by the image reception module 128.

The method 400 may begin at block 402, wherein the method 400 may include evaluating each pixel of at least two of the plurality of images to determine a change in speed of object(s). In an exemplary embodiment, upon receiving the image data associated with each image of the plurality of images and the image coordinates associated with each pixel of each image, the optical flow determinant module 130 may evaluate the image data associated with each of the plurality of images. More specifically, the optical flow determinant module 130 may evaluate the image data to determine image data associated with at least two images of the plurality of images captured during the predetermined period of time that are assigned locational coordinates that are matched within a predetermined distance threshold. In other words, the optical flow determinant module 130 may determine two or more images captured during the predetermined period of time that include portions of the same surface areas of the vehicle environment. Therefore, the optical flow determinant module 130 may determine at least two images that may be captured from a matching (e.g., within the predetermined distance threshold) frame of reference of the passenger wearing the wearable device 104.

Upon evaluating the image data and determining the at least two images of the plurality of images captured by the image sensor(s) 120 that are assigned matching locational coordinates, the optical flow determinant module 130 may evaluate each pixel of the two or more images to determine a change of speed of the object(s) captured within the images. More specifically, the optical flow determinant module 130 may evaluate each pixel of the at least two images that are assigned matching locational coordinates to determine a speed vector of objects included within pixels with matching image coordinates of each of the at least two images.

The speed vector may include a value (e.g. 0-10) that may be representative of the speed of movement of object(s) included within the pixels of the two or more images. Therefore, areas captured of the surrounding environment of the wearable device 104 that include an environment that is dynamic in nature may include a greater speed vector between the two or more images than objects that are static in nature. For example, areas captured outside of the window(s) of the vehicle 102 within the images that include the dynamic exterior environment surrounding the vehicle 102 may include a greater speed vector between the images in comparison to areas captured inside the interior cabin of the vehicle 102 that include the static interior environment. Upon evaluating each pixel of the two or more images and determining the speed vector of objects included within respective pixels (with matching image coordinates) of each of the two or more images, the optical flow determinant module 130 may store the speed vector for each pixel and associated image coordinates of the pixel on the storage unit 112 and/or the memory 118 to be further evaluated when determining the optical flow value associated with each pixel of each of the plurality of images.

The method 400 may proceed to block 404, wherein the method 400 may include evaluating each pixel of the at least two of the plurality of images to determine a change in position of object(s). As discussed above, the optical flow determinant module 130 may evaluate the image data and may determine the at least two images of the plurality of images captured by the image sensor(s) 120 that are assigned locational coordinates that are matched within a predetermined distance threshold. Upon determining the at least two images of the plurality of images, the optical flow determinant module 130 may evaluate each pixel of the two or more images to determine a change in the positioning of the object(s) captured within the images. More specifically, the optical flow determinant module 130 may evaluate each pixel of the two or more images that are assigned matching locational coordinates to determine a position vector of objects included within pixels with matching image coordinates of each of the at least two images.

The position vector may include a value (e.g. 0-10) that may be representative of a change in position of object(s) included within the pixels of the two or more images. In particular, the change in position of object(s) may pertain to a change in location of the object(s) (e.g., with respect to the vehicle 102) as captured within the at least two images. Therefore, areas captured of the surrounding environment of the wearable device 104 that include an environment that is dynamic in nature may include a greater position vector between the two or more images than objects that are static in nature. For example, areas captured outside of the window(s) of the vehicle 102 within the images that include the dynamic exterior environment surrounding the vehicle 102 may include a greater position vector between the images in comparison to areas captured inside the interior cabin of the vehicle 102 that include the static interior environment. Upon evaluating each pixel of each of the plurality of images and determining the position vector of objects included within respective pixels (with matching image coordinates) of each of the two or more images, the optical flow determinant module 130 may store the position vector for each pixel and associated image coordinates on the storage unit 112 and/or the memory 118 to be further evaluated when determining the optical flow associated with each pixel of each of the plurality of images.

The method 400 may proceed to block 406, wherein the method 400 may include evaluating each pixel of the at least two of the plurality of images to determine a change in rotation of object(s). Upon evaluating the image data and determining the at least two images of the plurality of images captured by the image sensor(s) 120, as discussed above, the optical flow determinant module 130 may evaluate each pixel of the two or more images to determine a change in a rotation of the object(s) included within the pixels of the two or more images. In particular, the change in rotation of object(s) may pertain to a change in an angle of the object(s) (e.g., with respect to the vehicle 102) as captured within the at least two images during the predetermined period of time. More specifically, the optical flow determinant module 130 may evaluate each pixel of the two or more images that are assigned matching locational coordinates to determine a rotation vector of objects included within pixels with matching image coordinates of each of the two or more images.

The rotation vector may include a value (e.g. 0-10) that may be representative of a change in rotation from the point of view of the passenger of object(s) included within pixels with matching image coordinates of each of the at least two images. Therefore, areas captured of the surrounding environment of the wearable device 104 that include an environment that is dynamic in nature may include a greater rotation vector between the two or more images than objects that are static in nature. For example, areas captured outside of the window(s) of the vehicle 102 within the images that include the dynamic exterior environment surrounding the vehicle 102 may include a greater rotation vector between the images in comparison to areas captured inside the interior cabin of the vehicle 102 that include the static interior environment. Upon evaluating each pixel of each of the plurality of images and determining the rotation vector of objects found at matching image coordinates of each of the two or more images, the optical flow determinant module 130 may store the rotation vector for each pixel and associated image coordinates on the storage unit 112 and/or the memory 118 to be further evaluated when determining the optical flow associated with each pixel of each of the plurality of images.

The method 400 may proceed to block 408, wherein the method 400 may include evaluating each pixel and a predetermined number of surrounding pixels of the at least two of the plurality of images to determine a change in acceleration of image data. Upon evaluating the image data and determining the at least two images of the plurality of images captured by the image sensor(s) 120, as discussed above, the optical flow determinant module 130 may evaluate image data associated with each pixel and the predetermined number of surrounding pixels of the two or more images to determine a change in acceleration of the image data. In one embodiment, the predetermined number of surrounding pixels may include one or more pixels of each of the at least two images that are located within a predetermined distance from the pixel that includes the matching image coordinates.

In an exemplary embodiment, the change in acceleration of the image data may pertain to an amount of change and a velocity of the change with respect to object(s) captured at one or more portions of each image captured within each pixel and the predetermined number of surrounding pixels of the two or more images of the plurality of images captured during the predetermined period of time. In particular, the optical flow determinant module 130 may evaluate each pixel and the predetermined number of surrounding pixels of the two or more images that are assigned matching locational coordinates to determine an acceleration vector of each of the two or more images. Therefore, areas captured of the surrounding environment of the wearable device 104 that include an environment that is dynamic in nature may include a greater acceleration vector between the two or more images than objects that are static in nature. For example, areas captured outside of the window(s) of the vehicle 102 within the images that include the dynamic exterior environment surrounding the vehicle 102 may include a greater acceleration vector between the images in comparison to areas captured inside the interior cabin of the vehicle 102 that include the static interior environment.

Upon determining the acceleration vector of each of the two or more images found, the optical flow determinant module 130 may store the acceleration vector for each pixel and associated image coordinates on the storage unit 112 and/or the memory 118 to be further evaluated when determining the optical flow associated with each pixel of each of the plurality of images.

With continued reference to the method 400 of FIG. 4, upon determining a change in the speed, positioning, and rotation of object(s) (as discussed with respect to blocks 402-406) and determining a change in acceleration of image data (as discussed with respect to block 408), the method 400 may proceed to block 410, wherein the method 400 may include determining the optical flow value associated with each pixel of the at least two of the plurality of images. In an exemplary embodiment, the optical flow determinant module 130 may access the storage unit 112 and/or the memory 118 to retrieve the speed vectors, position vectors, and rotation vectors, associated with each of the pixels of each image of the two or more images. Additionally, the optical flow determinant module 130 may retrieve the acceleration vectors associated with image data pertaining to each image of the two or more images. Upon retrieving the aforementioned vectors, the optical flow module 130 may process and aggregate the vector values associated with the speed vectors, position vectors, rotation vectors, and the acceleration vectors and may output an aggregated vector value as the optical flow value. Consequently, the optical flow determinant module 130 may associate a separate/specific optical flow value with each of the pixels of the at least two images.

Upon determining each optical flow value associated with each pixel of the two or more images, the optical flow module 130 may store the optical flow value associated with each pixel on the storage unit 112 and/or the memory 118. In one or more embodiments, the optical flow module 130 may communicate instruction signal(s) to the external surface module 132 to instruct the external surface module 132 that the optical flow value associated with each pixel of the plurality of pixels of each image has been determined and stored.

Referring again to the method 200 of FIG. 2, upon evaluating the plurality of images to determine an optical flow value associated with at least one pixel of at least two of the plurality of images (at block 204), the method 200 may proceed to block 206, wherein the method 200 may include determining at least one surface area that includes the at least one external environment. In one embodiment, upon the external surface module 132 receiving the instruction signal(s), the external surface module 132 may access the storage unit 112 and/or the memory 118 to retrieve the optical flow values associated to each of the pixels of each of the two or more images of the plurality of images captured for a predetermined period of time. In other words, the external surface module 132 may retrieve two or more optical flow values pertaining to each of the pixels with matching image coordinates of two or more images that are assigned matching locational coordinates. Therefore, the number of optical flow values retrieved by the external surface module 132 may be based on the number of images that are assigned matching locational coordinates captured within the predetermined period of time.

Upon retrieving the optical flow values associated to each of the pixels of each of the plurality of images, the external surface module 132 may track the optical flow values associated each of the pixels of two more images that are assigned matching locational coordinates and captured during the predetermined period of time. In one embodiment, the tracking of the optical flow values associated with the two or more images may include plotting (e.g., graphing) the optical flow values for the two or more images captured during the predetermined period of time. More specifically, the external surface module 132 may identify each pixel of the two or more images by determining the image coordinates of each pixel. Upon identifying each pixel, the external surface module 132 may access the storage unit 112 and/or the memory 118 to retrieve the optical flow values associated with each of the pixels of the two or more images.

In one or more embodiments, the external surface module 132 may plot the optical flow values associated with each of the pixels of the two or more images such that the optical flow values associated with all of the pixels of the two or more images are plotted (e.g., within a single graph). In particular, the external surface module 132 may plot the optical flow values to represent changes in the optical flow value associated with one or more respective pixels of the two or more images over the predetermined period of time to determine one or more surface areas that include the external environment surrounding the vehicle 102 that are included/captured within the pixels with matching image coordinates of each of the two or more images.

In one embodiment, upon plotting the optical flow values of the two or more images captured during the predetermined period of time, the external surface module 132 may track optical flow amplitude peaks that are plotted. The optical flow amplitude peaks may include optical flow values that are associated with each of the pixels that are plotted as peaking above a predetermined value to indicate a high amount of optical flow that may pertain to the capturing of dynamic data. In other words, the plotting of the optical flows associated with each of the pixels of the two or more images captured over the predetermined period of time may be evaluated to determine peaks that pertain to specific pixels of the two or more images (identified by respective image coordinates) that include the dynamic exterior environment surrounding the vehicle 102 rather than the static interior environment of the vehicle 102

Upon identifying one or more optical flow amplitudes that are plotted, the external surface module 132 may determine the specific pixel(s) that are associated with the optical flow amplitude peaks. More specifically, the external surface module 132 may identify one or more pixels with matching image coordinates from which the optical flow value data is derived over the predetermined period of time that correspond to the optical flow amplitude peaks. Upon identifying the one or more pixels with matching image coordinates from which the optical flow value data is derived that correspond to the optical flow amplitude peaks, the external surface module 132 may evaluate the one or more identified pixels and may determine the one or more surface areas that include the external environment surrounding the vehicle 102 are included within the one or more identified pixels. Based on the identifying of the one or more identified pixels, the external surface module 132 may determine the fixed lines from the two or more images that pertain to a border between one or more surface areas captured of the vehicle 102 that include the external surrounding environment of the vehicle 102 and the interior environment of the vehicle 102.

Figure 5:
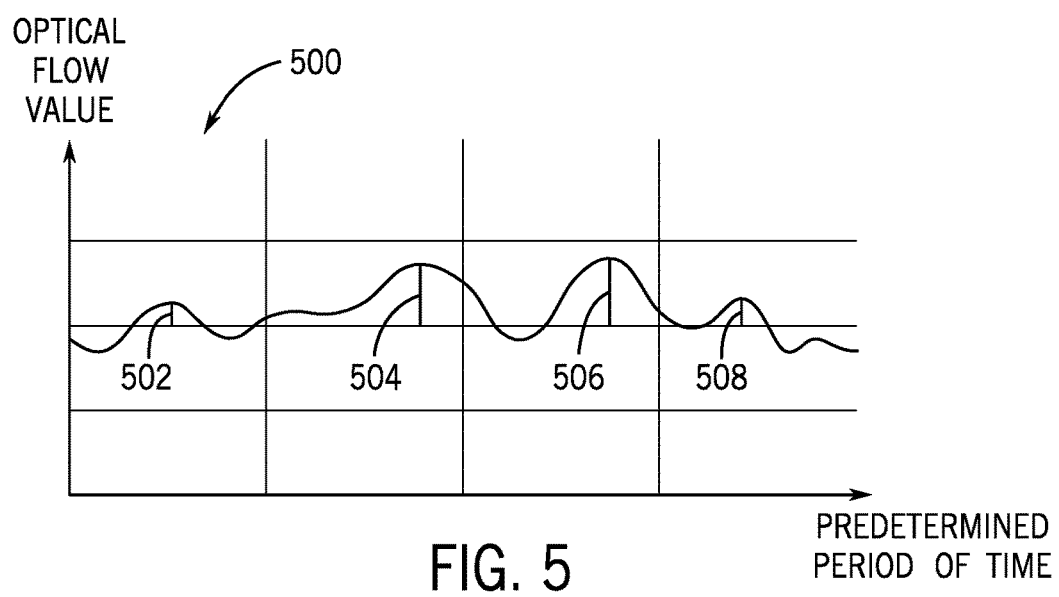
FIG. 5 is an illustration of an example of a graph plotting optical flow values of the at least one pixel of the at least two images of the plurality of images of the surface areas of the vehicle environment according to an exemplary embodiment.

As shown in an illustrative example of FIG. 5, the external surface module 132 may plot the optical flow values of the two or more images captured during of the plurality of images the predetermined period of time. The plotting of the optical flow values may be represented by a graph 500. Upon plotting the optical flow values, the external surface module 132 may determine optical flow amplitude peaks 502-508 that are based on the optical flow values that are associated with each of the pixels that peak above a predetermined value to indicate a high amount of optical flow. The external surface module 132 may evaluate the optical flow amplitude peaks 502-508 to determine one or more pixels with matching image coordinates from which the optical flow value data is derived that correspond to the optical flow amplitude peaks 502-508. The external surface module 132 may evaluate the one or more identified pixels to determine one or more surface areas of the vehicle environment within the two or more images that are assigned matching locational coordinates that include the external environment surrounding the vehicle 102.

Referring again to the method 200 of FIG. 2, upon determining the at least one surface area that includes the at least one external environment (at block 206), the method 200 may proceed to block 208, where the method 200 may include remapping the surface areas by filtering the at least one surface area that includes the at least one external environment. In an exemplary embodiment, upon determining one or more surface areas of the vehicle environment within the two or more images that include the external environment surrounding the vehicle 102, the external surface module 132 may send one or more data signals to the surface remapping module 134 with data pertaining to the image coordinates of the one or more identified pixels with matching image coordinates that correspond to the optical flow amplitude peaks.

Upon receiving the data signal(s) pertaining to the data pertaining to the one or more identified pixels, the surface remapping module 134 may send one or more command signal(s) to the processor 116 of the wearable device 104 to filter out one or more surface areas of images captured by the image sensor(s) 120 of the wearable device 104 that correspond to the image coordinates of the one or more identified pixels that correspond to the optical flow amplitude peaks. The filtering out of the one or more surface areas of the images may be completed to remap the surface areas of the vehicle environment. More specifically, the filtering may ensure that the vehicle augmentation application 106 may not render the surface area graphical augmentations at one or more areas of images captured by the image sensor(s) 120 that include the one or more identified pixels that are associated with the optical flow amplitude peaks. The filtering may enable the vehicle augmentation application 106 to render the surface area graphical augmentations at one or more remapped surface areas of the vehicle environment that do not include the dynamic exterior environment of the vehicle 102. Therefore, the static interior environment of the vehicle 102 may be rendered with the surface area graphical augmentations when the wearable device 104 is positioned at one or more specific positions within the vehicle frame as the passenger looks around and/or faces various areas within the interior cabin of the vehicle 102.

Figure 6:
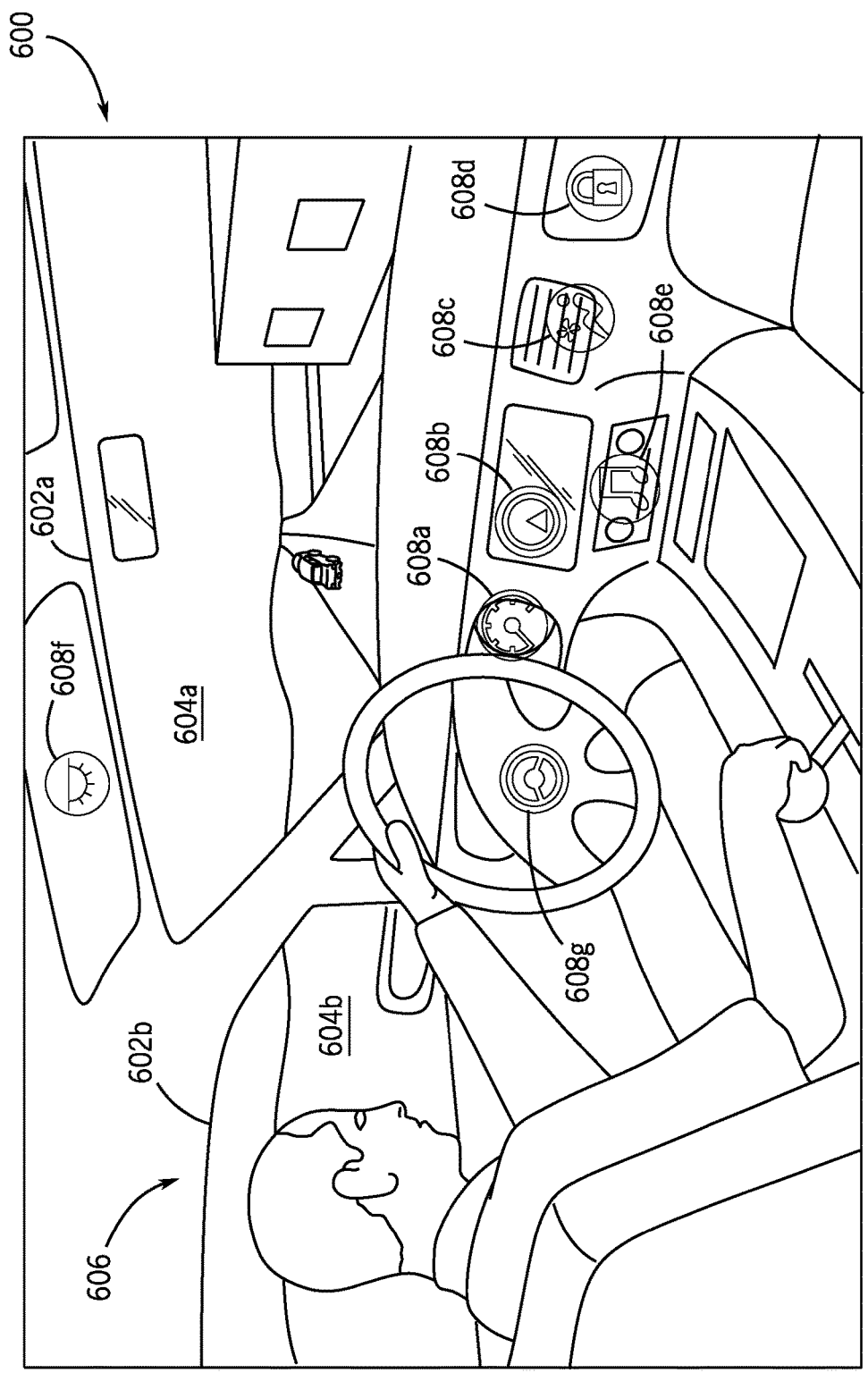
FIG. 6 is an illustration of an example of an augmented vehicle environment that may be presented to a passenger wearing a wearable device according to an exemplary embodiment.

As shown in an illustrative example illustrated in FIG. 6, the augmented vehicle environment 600 may be presented to a passenger viewing the optical display 122 while wearing the wearable device 104. As shown, upon the external surface module 132 determining fixed lines 602a, 602b that include the borders of a surface area 604a that includes a windshield and a surface area 604b that includes a side window of the interior cabin 606. The surface remapping module 134 may remap the surface areas by filtering the surface areas 604a, 604b that include the dynamic exterior environment. Additionally, the surface remapping module 134 may render the surface area graphical augmentations 608a-608g at one or more remapped surface areas of the vehicle environment that include the interior cabin 606 (static interior environment). As illustrated, the vehicle augmentation application 106 accounts for the one or more surface areas 604a, 604b that include the dynamic exterior environment surrounding the vehicle 102 and does not render the surface area graphical augmentations 608a-608g at the one or more respective surface areas 604a, 604b.

The embodiments discussed herein may also be described and implemented in the context of non-transitory computer-readable storage medium storing computer-executable instructions. Non-transitory computer-readable storage media includes computer storage media and communication media. For example, flash memory drives, digital versatile discs (DVDs), compact discs (CDs), floppy disks, and tape cassettes. Non-transitory computer-readable storage media may include volatile and nonvolatile, removable and non-removable media implemented in any method or technology for storage of information such as computer readable instructions, data structures, modules or other data. Non-transitory computer readable storage media excludes transitory and propagated data signals.

It will be appreciated that various implementations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer-implemented method for remapping surface areas of a vehicle environment, comprising:
receiving a plurality of images of the surface areas of the vehicle environment from a computing device, wherein the surface areas of the vehicle environment includes an internal environment of a vehicle and an external environment surrounding the vehicle;
evaluating the plurality of images to determine an optical flow value associated with at least one pixel of at least two images of the plurality of images;
determining at least one surface area that includes the external environment of the vehicle; and
remapping the surface areas by filtering the at least one surface area from which the external environment is captured, wherein filtering the at least one surface area includes prohibiting rendering of at least one graphic through at least one window of the vehicle.

2. The computer-implemented method of claim 1, wherein evaluating the plurality of images to determine the optical flow value associated with the at least one pixel includes determining image data associated with the at least two images, wherein the at least two images of the plurality of images are assigned locational coordinates that are matched within a predetermined distance threshold.

3. The computer-implemented method of claim 1, wherein evaluating the plurality of images to determine the optical flow value associated with the at least one pixel includes evaluating the at least one pixel of the at least two images to determine a speed vector, a position vector, and a rotation vector of at least one object included within the at least one pixel of the at least two images.

4. The computer-implemented method of claim 3, wherein the speed vector represents a change in speed of the at least one object captured within the at least two images, the position vector represents a change in position of the at least one object captured within the at least two images, and the rotation vector represents a change in a rotation of the at least one object captured within the at least two images.

5. The computer-implemented method of claim 4, wherein evaluating the plurality of images to determine the optical flow value associated with the at least one pixel includes evaluating the at least one pixel and a predetermined number of surrounding pixels of the at least two images to determine an acceleration vector of the at least two images, wherein the acceleration vector represents an amount of change within the at least one pixel and the predetermined number of surrounding pixels of the at least two images.

6. The computer-implemented method of claim 5, wherein evaluating the plurality of images to determine the optical flow value associated with the at least one pixel includes aggregating vector values associated with the speed vector, the position vector, the rotation vector, and the acceleration vector to determine the optical flow value.

7. The computer-implemented method of claim 6, wherein determining the at least one surface area includes tracking optical flow values associated with the at least one pixel of the at least two images, wherein the optical flow values associated with the at least one pixel of the at least two images are plotted to represent a change in the optical flow values over a predetermined period of time.

8. The computer-implemented method of claim 7, wherein determining the at least one surface area includes tracking optical flow amplitude peaks that are associated with the at least one pixel of the at least two images, wherein the at least one pixel of the at least two images that include the optical flow amplitude peaks are determined to include the surface area that includes the external environment.

9. The computer-implemented method of claim 8, wherein remapping the surface areas includes rendering at least one surface area graphical augmentation on at least one remapped surface area of the vehicle environment, wherein a portion of an image that corresponds to the at least one pixel of the at least two images that include the at least one surface area that includes the external environment is filtered out of the least one remapped surface area of the vehicle.

10. A system for remapping surface areas of a vehicle environment, comprising:
a memory storing instructions when executed by a processor cause the processor to:
receive a plurality of images of the surface areas of the vehicle environment from a computing device, wherein the surface areas of the vehicle environment includes an internal environment of a vehicle and an external environment surrounding the vehicle;
evaluate the plurality of images to determine an optical flow value associated with at least one pixel of at least two images of the plurality of images;
determine at least one surface area that includes the external environment of the vehicle; and
remap the surface areas by filtering the at least one surface area from which the external environment is captured, wherein filtering the at least one surface area includes prohibiting rendering of at least one graphic through at least one window of the vehicle.

11. The system of claim 10, wherein evaluating the plurality of images to determine the optical flow value associated with the at least one pixel includes determining image data associated with the at least two images, wherein the at least two images of the plurality of images are assigned locational coordinates that are matched within a predetermined distance threshold.

12. The system of claim 10, wherein evaluating the plurality of images to determine the optical flow value associated with the at least one pixel includes evaluating the at least one pixel of the at least two images to determine a speed vector, a position vector, and a rotation vector of at least one object included within the at least one pixel of the at least two images.

13. The system of claim 12, wherein the speed vector represents a change in speed of the at least one object captured within the at least two images, the position vector represents a change in position of the at least one object captured within the at least two images, and the rotation vector represents a change in a rotation of the at least one object captured within the at least two images.

14. The system of claim 13, wherein evaluating the plurality of images to determine the optical flow value associated with the at least one pixel includes evaluating the at least one pixel and a predetermined number of surrounding pixels of the at least two images to determine an acceleration vector of the at least two images, wherein the acceleration vector represents an amount of change within the at least one pixel and the predetermined number of surrounding pixels of the at least two images.

15. The system of claim 14, wherein evaluating the plurality of images to determine the optical flow value associated with the at least one pixel includes aggregating vector values associated with the speed vector, the position vector, the rotation vector, and the acceleration vector to determine the optical flow value.

16. The system of claim 15, wherein determining the at least one surface area includes tracking optical flow values associated with the at least one pixel of the at least two images, wherein the optical flow values associated with the at least one pixel of the at least two images are plotted to represent a change in the optical flow values over a predetermined period of time.

17. The system of claim 16, wherein determining the at least one surface area includes tracking optical flow amplitude peaks that are associated with the at least one pixel of the at least two images, wherein the at least one pixel of the at least two images that include the optical flow amplitude peaks are determined to include the surface area that includes the external environment.

18. The system of claim 17, wherein remapping the surface areas includes rendering at least one surface area graphical augmentation on at least one remapped surface area of the vehicle environment, wherein a portion of an image that corresponds to the at least one pixel of the at least two images that include the at least one surface area that includes the external environment is filtered out of the least one remapped surface area of the vehicle.

19. A non-transitory computer readable storage medium storing instructions that, when executed by a computer, which includes at least a processor, causes the computer to perform a method, the method comprising:
receiving a plurality of images of surface areas of a vehicle environment from a computing device, wherein the surface areas of the vehicle environment includes an internal environment of a vehicle and an external environment surrounding the vehicle;
evaluating the plurality of images to determine an optical flow value associated with at least one pixel of at least two images of the plurality of images;
determining at least one surface area that includes the external environment of the vehicle; and
remapping the surface areas by filtering the at least one surface area from which the external environment is captured, wherein filtering the at least one surface area includes prohibiting rendering of at least one graphic through at least one window of the vehicle.

20. The non-transitory computer readable storage medium of claim 19, wherein remapping the surface areas includes rendering at least one surface area graphical augmentation on at least one remapped surface area of the vehicle environment, wherein a portion of an image that corresponds to the at least one pixel of the at least two images that include the at least one surface area that includes the external environment is filtered out of the least one remapped surface area of the vehicle.

* * * * *